United States Patent
Ito et al.

(10) Patent No.: US 9,303,175 B2
(45) Date of Patent: Apr. 5, 2016

(54) INK COMPOSITION FOR INK JET RECORDING AND INK JET RECORDING METHOD

(71) Applicant: Seiko Epson Corporation, Tokyo (JP)

(72) Inventors: Jun Ito, Shimosuwa-machi (JP); Akihito Sao, Matsumoto (JP); Miho Nakamura, Shiojiri (JP); Keiji Iida, Chikuhoku-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 168 days.

(21) Appl. No.: 14/132,544

(22) Filed: Dec. 18, 2013

(65) Prior Publication Data

US 2014/0168335 A1   Jun. 19, 2014

(30) Foreign Application Priority Data

Dec. 18, 2012  (JP) ................. 2012-275562

(51) Int. Cl.
| | |
|---|---|
| *B41J 2/01* | (2006.01) |
| *C09D 11/328* | (2014.01) |
| *B41J 2/21* | (2006.01) |

(52) U.S. Cl.
CPC ............. *C09D 11/328* (2013.01); *B41J 2/2107* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC ........... 347/100, 95, 96, 101, 102, 88, 99, 21, 347/20, 9; 106/31.6, 31.13, 31.27; 523/160, 523/161

See application file for complete search history.

(56) References Cited

U.S. PATENT DOCUMENTS

| | | | |
|---|---|---|---|
| 7,328,991 B2* | 2/2008 | Sato et al. ............... | 347/100 |
| 2003/0081086 A1* | 5/2003 | Suzuki et al. ........... | 347/86 |
| 2007/0269619 A1 | 11/2007 | Kato et al. | |

(Continued)

FOREIGN PATENT DOCUMENTS

| | | |
|---|---|---|
| CN | 101001927 A | 7/2007 |
| JP | 2003-313462 A | 11/2003 |
| JP | 2007-307829 A | 11/2007 |

*Primary Examiner* — Manish S Shah
(74) *Attorney, Agent, or Firm* — Nutter McClennen & Fish LLP; John J. Penny, Jr.

(57) ABSTRACT

An ink composition for ink jet recording, containing: a dye; organic solvents; and water, wherein a ratio (S1/S2) of a content (S1) of the first organic solvent and a content (S2) of the second organic solvent being 15.3 or more and 205 or less: and wherein the organic solvents including a first organic solvent satisfying a following property (A) and a second organic solvent not satisfying the property (A), and property (A): when a mixture with polyvinyl alcohol is produced, a cluster having a mass of 70% or more based on a total mass of the mixture is formed and when a load of 5.3 g/mm² or more and 7.1 g/mm² or less is applied to the cluster, a cluster having a mass of 90% or more based on a total mass of the cluster is formed.

9 Claims, 1 Drawing Sheet

(56) References Cited

U.S. PATENT DOCUMENTS

2008/0138519 A1  6/2008  Habashi et al.
2009/0078889 A1* 3/2009  Udagawa et al. .......... 250/492.1

* cited by examiner

INK COMPOSITION FOR INK JET RECORDING AND INK JET RECORDING METHOD

BACKGROUND

1. Technical Field

The present invention relates to an ink composition for ink jet recording and an ink jet recording method using the same.

2. Related Art

Heretofore, a so-called ink jet recording method of recording images and characters on a recording medium by minute ink droplets discharged from nozzles of a head for ink jet recording is known. As an ink composition for use in such an ink jet recording method, those in which coloring materials, such as various kinds of dyes and pigments, are dissolved or dispersed in a mixture of an organic solvent and water have been widely utilized.

For example, JP-A-2003-313462 discloses an ink composition for ink jet recording containing a water-soluble dye, water, and a water-soluble organic solvent, such as tetraethylene glycol dimethyl ether. It is disclosed that, according to the ink composition, clogging of nozzles is suppressed and bleeding of images to be recorded is suppressed.

Moreover, JP-A-2007-307829 discloses an ink jet recording method of making an ink composition containing a water-soluble dye adhere onto an ink receiving layer containing a silica particle aggregate and polyvinyl pyrrolidone. It is disclosed that, according to the ink jet recording method, problems, such as bleeding and offset, can be solved.

To the ink composition described above, an organic solvent is sometimes added for the purpose of adjusting the wettability of ink to a recording medium to suppress the occurrence of bleeding and the like of images to be recorded, for example.

However, depending on the type and the content of the organic solvent contained in the ink composition, bleeding of images cannot be sufficiently suppressed or beading sometimes occurs. In particular, when images are formed on a recording medium having an ink receiving layer containing polyvinyl alcohol using the above-described ink composition, the occurrence of beading and bleeding tends to be noticeable.

SUMMARY

An advantage of some aspects of the invention is to provide an ink composition for ink jet recording and an ink jet recording method capable of suppressing the occurrence of bleeding and beading.

The invention has been made in order to at least partially solve the above-described problems, and can be realized as the following aspects or application examples.

APPLICATION EXAMPLE 1

According to an ink composition of an aspect of the invention is an ink composition for ink jet recording containing a dye, organic solvents, and water, in which the organic solvents include a first organic solvent satisfying the following property (A) and a second organic solvent satisfying the following property (B) or the following property (C) and the ratio (S1/S2) of the content (S1) of the first organic solvent and the content (S2) of the second organic solvent is 15.3 or more and 205 or less:

(A) when a mixture with polyvinyl alcohol is produced, a cluster having a mass of 70% or more based on the total mass of the mixture is formed and when a load of 5.3 $g/mm^2$ or more and 7.1 $g/mm^2$ or less is applied to the cluster, a cluster having a mass of 90% or more based on the total mass of the cluster is formed;

(B) when a mixture with polyvinyl alcohol is produced, a cluster having a mass of 70% or more based on the total mass of the mixture is formed and when a load of 5.3 $g/mm^2$ or more and 7.1 $g/mm^2$ or less is applied to the cluster, a cluster having a mass of 90% or more based on the total mass of the cluster is not formed; and (C) when a mixture with polyvinyl alcohol is produced, a cluster having a mass of 70% or more based on the total mass of the mixture is not formed.

According to the ink composition of Application Example 1, a high-quality image in which bleeding and beading are sufficiently suppressed can be recorded.

APPLICATION EXAMPLE 2

In Application Example 1, the total content of the first organic solvent and the second organic solvent can be 15% by mass or more and 50% by mass or less.

APPLICATION EXAMPLE 3

In Application Example 1 or 2, the content of the first organic solvent can be 15% by mass or more and 40% by mass or less.

APPLICATION EXAMPLE 4

In any one of Application Examples 1 to 3, the content of the second organic solvent can be 0.1% by mass or more and 5% by mass or less.

APPLICATION EXAMPLE 5

In any one of Application Examples 1 to 4, the solubility in 100 g of 20° C. water of both the first organic solvent and the second organic solvent can be 10 g or more.

APPLICATION EXAMPLE 6

In any one of Application Examples 1 to 5, the ink composition can be used for recording on a recording medium having an ink receiving layer containing polyvinyl alcohol.

APPLICATION EXAMPLE 7

An ink jet recording method according to one aspect of the invention is an ink jet recording method of performing recording on a recording medium having an ink receiving layer containing polyvinyl alcohol, in which the method includes a process of making the ink composition according to any none of Application Examples 1 to 6 adhere to the ink receiving layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
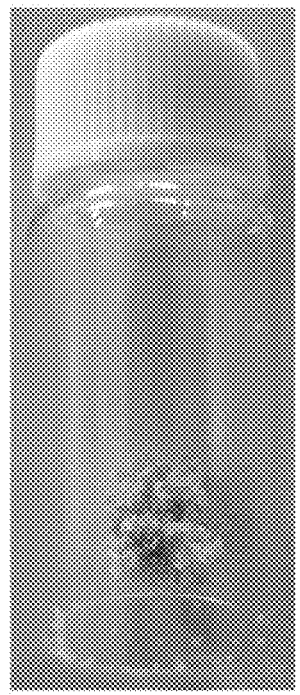
FIG. 1 is a photograph of a state after performing a classification test of an organic solvent using a first organic solvent.

Suitable embodiments of the invention are described below. The embodiments described below describe an example of the invention. The invention is not limited to the following embodiments and also includes various modifications carried out in the range where the gist of the invention is not altered.

In this specification, "beading" means local concentration unevenness of a similar color occurring when printing is performed with a single color or mixed color and does not mean that a portion in which the surface of a recording medium is not covered with an ink composition for recording remains. "Bleeding" refers to a state where the outline portion of a recorded image becomes blurred and unclear. In this specification, an "image" indicates a printing pattern formed from a dot group and also includes text printing and solid printing.

1. Ink Composition for Ink Jet Recording

An ink composition according to one embodiment of the invention is an ink composition for ink jet recording containing a dye, organic solvents, and water, in which the organic solvents include a first organic solvent satisfying the following property (A) described later and a second organic solvent satisfying the following property (B) or the following property (C) described later and the ratio (S1/S2) of the content (S1) of the first organic solvent and the content (S2) of the second organic solvent is 15.3 or more and 205 or less.

Hereinafter, components contained in the ink composition according to this embodiment are described.

1.1. Organic Solvent

The ink composition according to this embodiment contains an organic solvent. The organic solvent contains a first organic solvent satisfying the following property (A) and a second organic solvent satisfying the following property (B) or the following property (C).

According to this embodiment of the invention, the "organic solvent" refers to an organic solvent which is in a liquid state at 20° C. under one atmospheric pressure.

The first organic solvent contained in the ink composition according to this embodiment refers to one having a property (A) when a mixture with polyvinyl alcohol is produced, a cluster having a mass of 70% or more based on the total mass of the mixture is formed and when a load of 5.3 g/mm$^2$ or more and 7.1 g/mm$^2$ or less is applied to the cluster, a cluster having a mass of 90% or more based on the total mass of the cluster is formed.

The second organic solvent refers to one having a property (B) when a mixture with polyvinyl alcohol is produced, a cluster having a mass of 70% or more based on the total mass of the mixture is formed and when a load of 5.3 g/mm$^2$ or more and 7.1 g/mm$^2$ or less is applied to the cluster, a cluster having a mass of 90% or more based on the total mass of the cluster is not formed or a property (C) when a mixture with polyvinyl alcohol is produced, a cluster having a mass of 70% or more based on the total mass of the mixture is not formed.

In order to classify the property of the organic solvent into the above-described properties (A) to (C), specifically, the following operation was performed. First, 0.2 part by mass of the organic solvent is added dropwise to 1 part by mass of polyvinyl alcohol (hereinafter also referred to as "PVA") powder placed in a Petri dish for penetration. Then, after sufficiently mixing the same, a mixture (slurry) containing the PVA and the organic solvent is collected in a Petri dish in such a manner that the thickness of the mixture (slurry) is 0.5 mm. Subsequently, those obtained by storing the collected slurry under an environment of 25° C. and 50% RH for 3 hours were used as samples for classification evaluation.

Among the samples for classification evaluation thus obtained, one in which a cluster having a mass of 70% or more of the total mass of the sample was not formed was classified into an organic solvent having the property (C), i.e., the second organic solvent.

On the other hand, when a cluster having a mass of 70% or more of the total mass of the sample was formed, a load of 5.3 g/mm$^2$ or more and 7.1 g/mm$^2$ or less was applied to the center of the cluster using a glass stick whose top end shape is a flat circular section. In this case, one in which a cluster having a mass of 90% or more of the total mass of the cluster was not formed was classified into an organic solvent having the property (B), i.e., the second organic solvent. On the other hand, one in which a cluster having a mass of 90% or more of the total mass of the cluster was formed (including one in which a cluster does not collapse at all) was classified into an organic solvent having the property (A), i.e., the first organic solvent.

Thus, the first organic solvent easily makes the polyvinyl alcohol powder adhere to each other as compared with the second organic solvent.

Specifically mentioned as the first organic solvent are glycerol, 1,2-hexanediol, propylene glycol, 2-pyrolidone, N-methyl-2-pyrolidone, ethanol, ethylene glycol, triethanolamine, pentanediol, and the like. Moreover, Equamide M100 (Product name, manufactured by Idemitsu Kosan, Inc., Amide solvent) which is a commercially-available item is also classified into the first organic solvent. These compounds can be used singly or as a mixture of two or more kinds thereof.

Specifically mentioned as the second organic solvent are diethylene glycol, triethylene glycol, dipropylene glycol, tripropyrene glycol, diethylene glycol monohexyl ether, diethylene glycol mono-2-ethyl hexyl ether, tetraethylene glycol monohexyl ether, tetraethylene glycol mono-2-ethyl hexyl ether, hexaethylene glycol mono-2-ethyl hexyl ether, 2-methoxy ethanol, diethylene glycol monobutyl ether, diethylene glycol monomethyl ether, triethylene glycol monomethyl ether, triethylene glycol monobutyl ether, dipropylene glycol monopropyl ether, ethylene glycol monoethyl ether, ethylene glycol monobutyl ether, and the like. These substances can be used singly or as a mixture of two or more kinds thereof. Among the above, glycol ethers having an alkyl group having 6 to 8 carbon atoms are preferable because the effect as a penetrant is high and glycol ether quickly penetrates immediately after impacting on a recording medium, and therefore an effect of suppressing beading further increases. Among the glycol ethers having an alkyl group having 6 to 8 carbon atoms, diethylene glycol monohexyl ether is more preferable.

In both the first organic solvent and the second organic solvent, the solubility in 100 g of 20° C. water is preferably 10 g or more and more preferably 60 g or more. Thus, the first organic solvent and the second organic solvent favorably dissolve in water in the ink composition and the compatibility of the first organic solvent and the second organic solvent also becomes good, and therefore an ink composition in which the components are hardly separated and which has good storage stability is obtained.

The ratio (S1/S2) of the content (S1) of the first organic solvent and the content (S2) of the second organic solvent is 15.3 or more and 205 or less and preferably 25.6 or more and 122.5 or less. Due to the fact that the content ratio (S1/S2) of the first organic solvent and the second organic solvent is within the range mentioned above, the occurrence of beading and bleeding of an image to be recorded can be effectively suppressed. In particular, when the content ratio (S1/S2) is within the range mentioned above, particularly 25.6 or more, there is a tendency that the occurrence of bleeding can be further suppressed. Moreover, when the content ratio (S1/S2) is within the range mentioned above, particularly 122.5 or less, there is a tendency that the occurrence of beading can be further suppressed.

The operation effects produced when the content ratio (S1/S2) is within the range mentioned above are demonstrated in various recording media. However, the research of the present inventors has clarified that the effects are effectively demonstrated particularly in the case of a recording medium having an ink receiving layer containing polyvinyl alcohol.

The content of the first organic solvent is preferably 15% by mass or more and 40% by mass or less, more preferably 20.5% by mass or more and 37.5% by mass or less, and particularly preferably 20.5% by mass or more and 30.5% by mass or less based on the total mass of the ink composition. When the content of the first organic solvent is within the range mentioned above, the occurrence of bleeding and an overflow of ink on a recording medium can be suppressed and also the ink discharge stability becomes favorable.

The content of the second organic solvent is preferably 0.1% by mass or more and 5% by mass or less, more preferably 0.2% by mass or more and 4% by mass or less, and particularly preferably 0.2% by mass or more and 2% by mass or less based on the total mass of the ink composition. When the content of the second organic solvent is within the range mentioned above, the occurrence of beading is suppressed and also the wettability of ink can be improved.

The total content (S1+S2) of the first organic solvent and the second organic solvent is preferably 15% by mass or more and 50% by mass or less, more preferably 20% by mass or more and 40% by mass or less, and particularly preferably 20% by mass or more and 35% by mass or less based on the total mass of ink. When the total content (S1+S2) is within the range mentioned above, the occurrence of beading and bleeding can be suppressed and also effects of suppressing clogging of nozzles of an ink jet type recording head, improving the storage stability of ink, and the like are demonstrated.

1.2. Dye

The ink composition according to this embodiment contains a dye as a coloring material. Usable as the dye are various kinds of dyes for use in a usual ink jet recording apparatus, such as direct dyes, acid dyes, edible dyes, basic dyes, reactive dyes, disperse dye, vat dyes, soluble vat dyes, and reactive disperse dyes.

Mentioned as yellow dyes are, for example, C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165, C.I. Direct Yellow 1, 8, 11, 12, 24, 26, 27, 33, 39, 44, 50, 58, 85, 86, 87, 88, 89, 98, 110, 132, 142, and 144, C.I. Reactive Yellow 1, 2, 3, 4, 6, 7, 11, 12, 13, 14, 15, 16, 17, 18, 22, 23, 24, 25, 26, 27, 37, and 42, C.I. Food Yellow 3 and 4, C.I. Solvent Yellow 15, 19, 21, 30, and 109, and the like.

Mentioned as magenta dyes are, for example, C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64, C.I. Solubilized Red 1, C.I. Food Red 7, 9, and 14, and the like.

Mentioned as cyan dyes are, for example, C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249, C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249, C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46, C.I. Solubilized Vat Blue 1, 5, and 41, C.I. Vat Blue 4, 29, and 60, C.I. Food Blue 1 and 2, C.I. Basic blue 9, 25, 28, 29, and 44, and the like.

The content of the dye can be set as appropriate as desired and is not particularly limited and, for example, can be 1% by mass or more and 20% by mass or less and further 1% by mass or more and 10% by mass or less based on the total mass of the ink composition.

1.3. Water

The ink composition according to this embodiment contains water. Water is a medium which is a main component of the ink composition and is a component which evaporates and scatters by drying. As water, pure water and ultrapure water in which ionic impurities are removed as much as possible, such as ion exchange water, ultrafiltration water, reverse osmosis water, and distilled water, are mentioned, for example. When water which is sterilized by ultraviolet ray radiation, addition of hydrogen peroxide, and the like is used, the generation of mold and bacteria can be prevented when storing the ink composition over a long period of time. The content of water contained in the ink composition is not particularly limited and can be 50% by mass or more and further 50% by mass or more and 80% by mass or less based on the total mass of the ink composition.

1.4. Other Components

The ink composition according to this embodiment may contain a surfactant, a pH adjuster, an antiseptic/antifungal agent, an antirust agent, a chelating agent, and the like for the purpose of increasing the performance.

Surfactant

A surfactant has a function of uniformly wetting and spreading on a recording medium. Thus, a clear image with less density unevenness can be recorded.

Surfactants having such an effect are preferably nonionic surfactants and more preferably silicone surfactants and/or acetylene glycol surfactants.

Among the silicone surfactants, a polysiloxane compound and the like are preferable and polyether modified organosiloxane and the like are more preferably used. Mentioned as specific examples of the silicone surfactants are BYK-306, BYK-307, BYK-333, BYK-341, BY K-345, BYK-346, and BYK-348 (all Product names, manufactured by BYK Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all Product names, manufactured by Shin-Etsu Chemical Co., Ltd.), and the like. The content of the silicone surfactant is preferably 2.0% by mass or less based on the total mass of the ink composition.

The acetylene glycol surfactant has properties of excellent capability of keeping surface tension and interfacial tension at an appropriate level and less foamability as compared with other nonionic surfactants. Thus, the ink composition containing the acetylene glycol surfactant can keep the surface tension and the interfacial tension with printer members in contact with ink, such as a head nozzle surface, at an appropriate level. Therefore, when the ink composition is applied to an ink jet recording system, the discharge stability can be increased. Since the acetylene glycol surfactant acts as a good wettability and penetrant to a recording medium, a high definition image with less density unevenness and bleeding can be obtained. The content of the acetylene glycol surfactant is preferably 2.0% by mass or less based on the total mass of the ink composition.

Mentioned as specific examples of the acetylene glycol surfactant are Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all Product names, manufactured by Air Products and Chemicals. Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all Product names, manufactured by Nisshin Chemical Co., Ltd.), Acetylenol E00, E00P, E40, and E100 (all Product names, manufactured by Kawaken Fine Chemicals Co., Ltd.), and the like.

PH Adjuster

As a pH adjuster, various kinds of organic acids, inorganic acids, organic bases, and inorganic bases are mentioned.

Antiseptic/Antifungal Agent

The ink composition according to this embodiment may contain an antiseptic/antifungal agent. Mentioned as the antiseptic/antifungal agent are, for example, sodium benzoate, sodium pentachlorophenol, sodium-2-pyridinethiol-1-oxide, sodium sorbate, sodium dehydroacetate, 1,2-benzisothiazoline-3-one, and the like. Mentioned as commercially-available items are Proxel XL2, Proxel GXL (all Product names, manufactured by Avecia Inc.), Denicide CSA, NS-500W (all Product names, manufactured by Nagase ChemteX Corporation), and the like.

Antirust Agent

As an antirust agent, benzotriazole and the like are mentioned, for example.

Chelating Agent

Mentioned as a chelating agent are, for example, ethylenediaminetetraacetic acid (EDTA), salts thereof (disodium dihydrogen ethylenediaminetetraacetate and the like), and the like.

1.5. Preparation Method

The ink composition according to this embodiment is obtained by mixing the components mentioned above in an arbitrary order, and then performing filtration or the like as required to remove impurities. As a mixing method of the components, a method of successively adding materials in a container having a stirring device, such as a mechanical stirrer and a magnetic stirrer, and then stirring and mixing the materials is suitably used. As the filtration method, centrifugal filtration, filter filtration, and the like can be performed as required.

1.6. Physical Properties

In the ink composition according to this embodiment, the surface tension at 20° C. is preferably 25 mN/m or more and 40 mN/m or less from the viewpoint of the balance between the image quality and the reliability as an ink jet ink. The measurement of the surface tension can be achieved by, for example, determining the surface tension when a platinum plate is wetted with the ink under a 20° C. environment using an automatic surface tension meter CBVP-Z (Product name, manufactured by Kyowa Interface Science Co., LTD.).

From the same viewpoint, the viscosity at 20° C. of the ink composition according to this embodiment is preferably 2.5 mPa·s or more and 6 mPa·s or less. The measurement of the viscosity can be achieved by measuring the viscosity under a 20° C. environment using a viscoelasticity tester MCR-300 (Product name, manufactured by Pysica), for example.

1.7. Use

The ink composition according to this embodiment demonstrates the effect of suppressing the occurrence of beading and bleeding described above even when used for various recording media. In particular, when used for a recording medium having a swelling type receiving layer, the above-described effect further increases. The swelling type receiving layer refers to one containing a swellable resin, which swells by absorbing ink, as the main component (i.e., 50% by mass or more based on the total mass of the receiving layer). As receiving layers other than the swelling type receiving layer, a void type receiving layer containing inorganic particles, such as silica, as the main component and absorbs ink into the void is known.

The swellable resin is not particularly limited and, for example, polyvinyl alcohol (PVA), gelatin, polyvinyl pyrrolidone, polyethylene oxide, and the like are mentioned, and polyvinyl alcohol (PVA) can be preferably used from the viewpoint of water resistance.

Moreover, the polyvinyl alcohol according to this embodiment of the invention also includes, in addition to polyvinyl alcohol obtained by hydrolyzing polyvinyl acetate, modified polyvinyl alcohols, such as polyvinyl alcohol whose end is cation-modified and anion-modified polyvinyl alcohol having an anionic group. The degree of saponification of the polyvinyl alcohol obtained by hydrolyzing vinyl acetate is not particularly limited and can be set to 70 to 100% by mol, for example. The degree of saponification is preferably set to 80% by mol or more from the viewpoint of water resistance.

The swelling type receiving layer contains the swellable resin as the main component and a high molecular weight compound other than the swellable resin may be added thereto. Mentioned as such a high molecular weight compound are, for example, starch, cellulose derivatives, such as carboxymethyl cellulose, casein, gelatin, conjugated diene copolymer latexes, such as a styrene-butadiene copolymer, vinyl copolymer latexes, such as an ethylene-vinyl acetate copolymer, acrylic copolymer latexes, such as polymers of acrylic acid and methacrylic acid, and the like. These substances can be used singly or in combination of two or more kinds thereof.

The ink receiving layer is formed by preparing an ink receiving layer liquid (coating liquid), applying the same onto a base material by a known coating tool, such as a roll coater, and then drying.

As the base material on which the ink receiving layer is provided, any known base material can be used. For example, besides regular paper, synthetic paper, and coated paper, sheets and the like formed with polyester (polyethylene terephthalate and the like), cellulose triacetate, polycarbonate, polyolefin (homopolymers of olefins, such as low density polyethylene, high density polyethylene, polypropylene, polybutene, and polypentene or copolymers, such as an ethylene-propylene copolymer), polyvinyl chloride, polyimide, and the like can be used.

2. Ink Jet Recording Method

An ink jet recording method according to one embodiment of the invention is an ink jet recording method of performing recording on a recording medium having an ink receiving layer containing polyvinyl alcohol (PVA) and includes a process of making the above-described ink composition adhere to the ink receiving layer. According to the ink jet recording method of this embodiment, by recording an image on the ink receiving layer containing polyvinyl alcohol using the above-described ink composition, the occurrence of beading and bleeding can be effectively reduced, so that good recorded matter is obtained.

An ink jet recording apparatus is not particularly limited insofar as the apparatus has a discharge tool for discharging the above-described ink composition to the above-described recording medium.

The above-described discharge tool is one of discharging liquid droplets of the above-described ink composition onto the ink receiving layer of the recording medium, and recording an image on the recording medium by an ink jet recording system. As the discharge tool, a known system can be used. In particular, an operation of discharging the liquid droplets utilizing the vibration of piezoelectric elements, i.e., a recording operation using a head of forming ink droplets by mechanical deformation of electrostriction elements, is mentioned. By the recording operation, excellent recording can be performed.

EXAMPLES

Hereinafter, the invention is more specifically described with reference to Examples and Comparative Examples but the invention is not limited only to the Examples.
3.1. Preparation of Ink Composition
3.1.1. Classification Test of Organic Solvent The organic solvents contained in the ink composition were classified into the first organic solvent or the second organic solvent in accordance with the following method.

First, 0.2 part by mass of an organic solvent was added dropwise to 1 part by mass of polyvinyl alcohol powder placed in a Petri dish (Product name "VF-10", manufactured by Japan VAM & POVAL CO., LTD., Degree of saponification: 98.0 to 99.0% by mol) for penetration. Then, after sufficiently mixing the same, 0.5 part by mass of a mixture (slurry) containing the PVA and the organic solvent was collected in a Petri dish, and then the shape was adjusted in such a manner that the thickness of the slurry was 0.5 mm. Then, the slurry on the Petri dish was stored under an environment of 25° C. and 50% RH for 3 hours to be used as samples for classification test.

Among the obtained samples for classification test, one in which a cluster having a mass of 70% or more of the total mass of the sample was not formed was classified into the second organic solvent.

On the other hand, when a cluster having a mass of 70% or more of the total mass of the sample was formed, a load of 5.3 $g/mm^2$ or more and 7.1 $g/mm^2$ or less was applied to the center of the cluster using a glass stick whose top end shape was a flat circular section. In this case, one in which a cluster having a mass of 90% or more of the total mass of the cluster was not formed was classified into the second organic solvent. In contrast thereto, one in which a cluster having a mass of 90% or more of the total mass of the cluster was formed (including one in which a cluster did not collapse at all) was classified into the first organic solvent.

Figure 2:
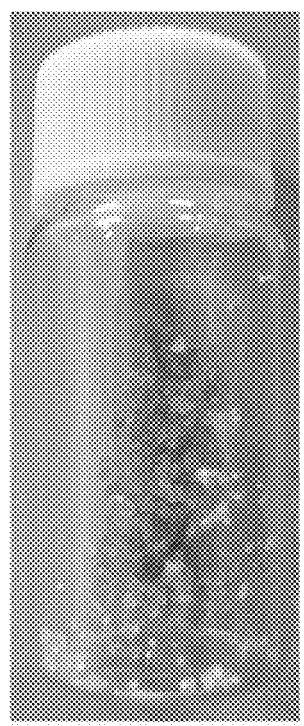
FIG. 2 is a photograph of a state after performing a classification test of an organic solvent using a second organic solvent.

FIG. 1 is a photograph of a state after performing the classification test of the organic solvent using the first organic solvent. FIG. 2 is a photograph of a state after performing the classification test of the organic solvent using the second organic solvent. The photographs were taken by bottling the sample for classification evaluation after subjected to the classification test of the organic solvent in a sample bottle, and then laying the sample bottle down.

As illustrated in FIG. 1, in the sample produced using the first organic solvent, the PVA powder adheres to each other to form a large cluster. On the other hand, as illustrated in FIG. 2, in the sample produced using the second organic solvent, the PVA powder partially adheres to each other but is divided into two or more small clusters.
3.1.2. Preparation of Ink Composition The components were mixed and stirred for 2 hours using a magnetic stirrer with the combination amounts shown in Tables 1 and 2. Then, the mixture was filtered using a PTFE membrane filter with a pore size of 5 μm, thereby obtaining ink compositions according to Examples and Comparative Examples to be used in the following evaluation.

The unit of the numerical values shown in Tables 1 and 2 is % by mass. The components indicated by one except the compound name among the components are as follows.

Y dye (Direct Yellow 132, manufactured by Daiwa Chemicals, Inc.)

C dye (Direct blue 199, manufactured by Daiwa Chemicals, Inc.)

Olfine PD002W (Acetylene glycol surfactant, Product name, manufactured by Nisshin Chemical Co., Ltd.)

Benzotriazole (Antirust agent, manufactured by Kanto Kagaku)

EDTA (Ethylenediaminetetraacetic acid, Chelating agent, manufactured by Kanto Kagaku)

Proxel XL-2 (Antiseptic/antifungal agent, manufactured by Avecia Inc.)
3.2. Evaluation Test
3.2.1. Bleeding Evaluation Using the ink compositions according to Examples and Comparative Examples, Alphabets A to Z (Capital letter and Small letter) were printed in a font size of 4 pt and 10 pt under the conditions of Duty 100% with a single color of yellow ink and a single color of cyan ink on a recording medium (Product name "Gallery classic gloss" manufactured by ILFORD, Recording medium having an ink receiving layer containing PVA) using "PX-G930" manufactured by Seiko Epson Corp. Thereafter, bleeding was visually observed. The evaluation criteria are as follows. The evaluation results are shown in Tables 1 and 2.
A: No bleeding was observed in both the printing in 4 pt and the printing in 10 pt, and the printings can be recognized as characters.
B: Bleeding was slightly observed but both the printing in 4 pt and the printing in 10 pt can be recognized as characters.
C: Due to bleeding, the printing in 4 pt cannot be recognized as characters but the printing in 10 pt can be visually recognized as characters.
D: Bleeding is noticeable and the printing in 4 pt and the printing in 10 pt cannot be visually recognized as characters.
3.2.2. Beading Evaluation Using the ink compositions according to Examples and Comparative Examples, a 3 cm×3 cm evaluation patch was printed in green obtained by combining yellow ink and cyan ink on a recording medium (Product name "Gallery classic gloss", manufactured by ILFORD, Recording medium having an ink receiving layer containing PVA) in the range of the total printing Duty of 50% to 100% using "PX-G930" manufactured by Seiko Epson Corp. Thereafter, beading was visually observed. The evaluation criteria are as follows. The evaluation results are shown in Tables 1 and 2.
A: Beading does not occur even when the total printing Duty is 100%.
B: Beading does not occur before the total printing Duty reaches 90% but when the total Duty is 100%, beading occurs.

C: Beading does not occur before the total printing Duty reaches 80% but when the total Duty is 90%, beading occurs.

D: Beading occurs even when the total printing Duty is 70%.

In this specification, the "printing Duty" is a value calculated by the following expression.

Printing Duty(%)=Number of actually printed dots/ (Vertical resolution×Horizontal resolution)×100

(In the expression, "Number of actually printed dots" is the number of the actually printed dots per unit area and "Vertical resolution" and "Horizontal resolution" each are the resolution per unit area.)

3.2.3 Evaluation Results

The evaluation results above are shown in Tables 1 and 2.

TABLE 1

| | | Example 1 | | Example 2 | | Example 3 | | Example 4 | | Example 5 | |
|---|---|---|---|---|---|---|---|---|---|---|---|
| Composition | | C1 | Y1 | C2 | Y2 | C3 | Y3 | C4 | Y4 | C5 | Y5 |
| Coloring material | C dye | 3 | | 3 | | 3 | | 3 | | 3 | |
| | Y dye | | 3 | | 3 | | 3 | | 3 | | 3 |
| First organic solvent | Glycerol | 15 | 15 | 12 | 12 | 10 | 10 | 10 | 10 | 10 | 10 |
| | 1,2-hexanediol | 5 | 5 | 10 | 10 | 5 | 5 | 0 | 0 | 4 | 4 |
| | Propylene glycol | 10 | 10 | 0 | 0 | 5 | 5 | 10 | 10 | 10 | 10 |
| | 2-pyrolidone | 0 | 0 | 5 | 5 | 0 | 0 | 0 | 0 | 0 | 0 |
| | Ethylene glycol | 0 | 0 | 0 | 0 | 0 | 0 | 0 | 0 | 0 | 0 |
| | Pentanediol | 0 | 0 | 0 | 0 | 0 | 0 | 10 | 10 | 0 | 0 |
| | Triethanolamine | 0.5 | 0.5 | 0.5 | 0.5 | 0.5 | 0.5 | 0.5 | 0.5 | 0.5 | 0.5 |
| Second organic solvent | Triethylene glycol | 0 | 0 | 0 | 0 | 0 | 0 | 2 | 2 | 0 | 0 |
| | Diethylene glycol monohexyl ether | 1 | 1 | 0 | 0 | 0 | 0 | 0 | 0 | 0.2 | 0.2 |
| | Diethylene glycol monobutyl ether | 0 | 0 | 0.5 | 0.5 | 0 | 0 | 0 | 0 | 0 | 0 |
| | Triethylene glycol monobutyl ether | 0 | 0 | 0 | 0 | 0.8 | 0.8 | 0 | 0 | 0 | 0 |
| Surfactant | Olfine PD002W | 1 | 1 | 1 | 1 | 1 | 1 | 1 | 1 | 1 | 1 |
| Antirust agent | Benzotriazole | 0.01 | 0.01 | 0.01 | 0.01 | 0.01 | 0.01 | 0.01 | 0.01 | 0.01 | 0.01 |
| Chelating agent | EDTA | 0.02 | 0.02 | 0.02 | 0.02 | 0.02 | 0.02 | 0.02 | 0.02 | 0.02 | 0.02 |
| Antiseptic/antifungal agent | Proxel XL-2 | 0.3 | 0.3 | 0.3 | 0.3 | 0.3 | 0.3 | 0.3 | 0.3 | 0.3 | 0.3 |
| Pure water | | 64.17 | 64.17 | 67.67 | 67.67 | 74.37 | 74.37 | 63.17 | 63.17 | 70.97 | 70.97 |
| Total (% by mass) | | 100 | 100 | 100 | 100 | 100 | 100 | 100 | 100 | 100 | 100 |
| Content of first organic solvent (S1) | | 30.5 | 30.5 | 27.5 | 27.5 | 20.5 | 20.5 | 30.5 | 30.5 | 24.5 | 24.5 |
| Content of second organic solvent (S2) | | 1 | 1 | 0.5 | 0.5 | 0.8 | 0.8 | 2 | 2 | 0.2 | 0.2 |
| S1/S2 | | 30.5 | 30.5 | 55.0 | 55.0 | 25.6 | 25.6 | 15.3 | 15.3 | 122.5 | 122.5 |
| Evaluation results | Bleeding (cyan ink) | A | | A | | A | | B | | A | |
| | Bleeding (yellow ink) | A | | A | | A | | B | | A | |
| | Aggregation unevenness | A | | A | | A | | A | | A | |
| | | Example 6 | | Example 7 | | Example 8 | | Example 9 | | Example 10 | |
| Composition | | C6 | Y6 | C7 | Y7 | C8 | Y8 | C9 | Y9 | C10 | Y10 |
| Coloring material | C dye | 3 | | 3 | | 3 | | 3 | | 3 | |
| | Y dye | | 3 | | 3 | | 3 | | 3 | | 3 |
| First organic solvent | Glycerol | 15 | 15 | 12 | 12 | 12 | 12 | 12 | 12 | 15 | 15 |
| | 1,2-hexanediol | 5 | 5 | 10 | 10 | 10 | 10 | 10 | 10 | 5 | 5 |
| | Propylene glycol | 10 | 10 | 0 | 0 | 0 | 0 | 0 | 0 | 0 | 0 |
| | 2-pyrolidone | 0 | 0 | 0 | 0 | 0 | 0 | 0 | 0 | 0 | 0 |
| | Ethylene glycol | 0 | 0 | 10 | 10 | 10 | 10 | 10 | 10 | 0 | 0 |
| | Pentanediol | 0 | 0 | 5 | 5 | 5 | 5 | 5 | 5 | 0 | 0 |
| | Triethanolamine | 0.5 | 0.5 | 0.5 | 0.5 | 0.5 | 0.5 | 0.5 | 0.5 | 0.5 | 0.5 |
| Second organic solvent | Triethylene glycol | 0 | 0 | 0 | 0 | 0 | 0 | 0.5 | 0.5 | 0 | 0 |
| | Diethylene glycol monohexyl ether | 0 | 0 | 0.3 | 0.3 | 0 | 0 | 0 | 0 | 0.1 | 0.1 |
| | Diethylene glycol monobutyl ether | 0 | 0 | 0 | 0 | 0 | 0 | 0 | 0 | 0 | 0 |
| | Triethylene glycol monobutyl ether | 1 | 1 | 0 | 0 | 0.5 | 0.5 | 0 | 0 | 0 | 0 |
| Surfactant | Olfine PD002W | 1 | 1 | 1 | 1 | 1 | 1 | 1 | 1 | 1 | 1 |
| Antirust agent | Benzotriazole | 0.01 | 0.01 | 0.01 | 0.01 | 0.01 | 0.01 | 0.01 | 0.01 | 0.01 | 0.01 |
| Chelating agent | EDTA | 0.02 | 0.02 | 0.02 | 0.02 | 0.02 | 0.02 | 0.02 | 0.02 | 0.02 | 0.02 |
| Antiseptic/antifungal agent | Proxel XL-2 | 0.3 | 0.3 | 0.3 | 0.3 | 0.3 | 0.3 | 0.3 | 0.3 | 0.3 | 0.3 |
| Pure water | | 64.17 | 64.17 | 57.87 | 57.87 | 57.67 | 57.67 | 57.67 | 57.67 | 75.07 | 75.07 |
| Total (% by mass) | | 100 | 100 | 100 | 100 | 100 | 100 | 100 | 100 | 100 | 100 |
| Content of first organic solvent (S1) | | 30.5 | 30.5 | 37.5 | 37.5 | 37.5 | 37.5 | 37.5 | 37.5 | 20.5 | 20.5 |
| Content of second organic solvent (S2) | | 1 | 1 | 0.3 | 0.3 | 0.5 | 0.5 | 0.5 | 0.5 | 0.1 | 0.1 |
| S1/S2 | | 30.5 | 30.5 | 125.0 | 125.0 | 75.0 | 75.0 | 75.0 | 75.0 | 205.0 | 205.0 |
| Evaluation results | Bleeding (cyan ink) | B | | A | | A | | A | | A | |
| | Bleeding (yellow ink) | B | | A | | A | | A | | A | |
| | Aggregation unevenness | A | | B | | B | | B | | B | |

TABLE 2

| Composition | | Comparative Example 1 | | Comparative Example 2 | | Comparative Example 3 | | Comparative Example 4 | | Comparative Example 5 | | Comparative Example 6 | |
|---|---|---|---|---|---|---|---|---|---|---|---|---|---|
| | | C1 | Y1 | C2 | Y2 | C3 | Y3 | C4 | Y4 | C5 | Y5 | C6 | Y6 |
| Coloring material | C dye | 3 | | 3 | | 3 | | 3 | | 3 | | 3 | |
| | Y dye | | 3 | | 3 | | 3 | | 3 | | 3 | | 3 |
| First organic solvent | Glycerol | 10 | 10 | 10 | 10 | 15 | 15 | 15 | 15 | 15 | 15 | 0 | 0 |
| | 1,2-hexanediol | 0 | 0 | 5 | 5 | 0 | 0 | 0 | 0 | 0 | 0 | 0 | 0 |
| | Propylene glycol | 10 | 10 | 10 | 10 | 10 | 10 | 0 | 0 | 0 | 0 | 0 | 0 |
| | 2-pyrolidone | 0 | 0 | 0 | 0 | 8 | 8 | 0 | 0 | 0 | 0 | 0 | 0 |
| | Ethylene glycol | 0 | 0 | 0 | 0 | 0 | 0 | 0 | 0 | 0 | 0 | 0 | 0 |
| | Pentanediol | 0 | 0 | 0 | 0 | 10 | 10 | 0 | 0 | 0 | 0 | 0 | 0 |
| | Triethanolamine | 0.5 | 0.5 | 0.5 | 0.5 | 0.5 | 0.5 | 0.5 | 0.5 | 0.5 | 0.5 | 0.5 | 0.5 |
| Second organic solvent | Triethylene glycol | 10 | 10 | 0 | 0 | 0 | 0 | 6 | 6 | 6 | 6 | 15 | 15 |
| | Diethylene glycol monohexyl ether | 0 | 0 | 0 | 0 | 0 | 0 | 1 | 1 | 6 | 6 | 0 | 0 |
| | Diethylene glycol monobutyl ether | 0 | 0 | 0 | 0 | 0 | 0 | 0 | 0 | 0 | 0 | 0 | 0 |
| | Triethylene glycol monobutyl ether | 0 | 0 | 0.1 | 0.1 | 15 | 15 | 0 | 0 | 0 | 0 | 20 | 20 |
| Surfactant | Olfine PD002W | 1 | 1 | 1 | 1 | 1 | 1 | 1 | 1 | 1 | 1 | 1 | 1 |
| Antirust agent | Benzotriazole | 0.01 | 0.01 | 0.01 | 0.01 | 0.01 | 0.01 | 0.01 | 0.01 | 0.01 | 0.01 | 0.01 | 0.01 |
| Chelating agent | EDTA | 0.02 | 0.02 | 0.02 | 0.02 | 0.02 | 0.02 | 0.02 | 0.02 | 0.02 | 0.02 | 0.02 | 0.02 |
| Antiseptic/antifungal agent | Proxel XL-2 | 0.3 | 0.3 | 0.3 | 0.3 | 0.3 | 0.3 | 0.3 | 0.3 | 0.3 | 0.3 | 0.3 | 0.3 |
| Pure water | | 65.17 | 65.17 | 70.07 | 70.07 | 37.17 | 37.17 | 73.17 | 73.17 | 68.17 | 68.17 | 60.17 | 60.17 |
| Total (% by mass) | | 100 | 100 | 100 | 100 | 100 | 100 | 100 | 100 | 100 | 100 | 100 | 100 |
| Content of first organic solvent (S1) | | 20.5 | 20.5 | 25.5 | 25.5 | 43.5 | 43.5 | 15.5 | 15.5 | 15.5 | 15.5 | 0.5 | 0.5 |
| Content of second organic solvent (S2) | | 10 | 10 | 0.1 | 0.1 | 15 | 15 | 7 | 7 | 12 | 12 | 35 | 35 |
| S1/S2 | | 2.1 | 2.1 | 255.0 | 255.0 | 2.9 | 2.9 | 2.2 | 2.2 | 1.3 | 1.3 | 0.01 | 0.01 |
| Evaluation results | Bleeding (cyan ink) | C | | C | | C | | D | | D | | D | |
| | Bleeding (yellow ink) | | C | | C | | C | | D | | D | | D |
| | Aggregation unevenness | D | | D | | D | | D | | C | | D | |

As is clear from the evaluation results of Table 1, it was found that the ink compositions according to Examples can effectively reduce the occurrence of beading and bleeding particularly when recording an image on a recording medium having an ink receiving layer containing PVA, so that good printing results are obtained.

The aspects of the invention are not limited to the embodiments described above, and various modifications are possible. For example, the aspects of the invention include essentially the same configurations as the configurations described in the embodiments (for example, a configuration in which the functions, methods, and results are the same, or a configuration in which the objects and the effects are the same). Further, the aspects of the invention also include configurations in which non-essential portions of the configurations described in the embodiments are substituted. Further, the aspects of the invention include configurations demonstrating the same operation effects or configurations achieving the same objects as the configurations described in the embodiments. Further, the aspects of the invention include configurations in which common technologies are added to the configurations described in the embodiments.

The entire disclosure of Japanese Patent Application Nos: 2012-275562 filed Dec. 18, 2012 is expressly incorporated by reference herein.

What is claimed is:

1. An ink composition for ink jet recording, comprising:
a dye;
organic solvents; and
water, wherein
a ratio (S1/S2) of a content (S1) of the first organic solvent and a content (S2) of the second organic solvent being 15.3 or more and 205 or less; and wherein,
the organic solvents including a first organic solvent satisfying a following property (A) and a second organic solvent not satisfying the property (A),
property (A): when a mixture with polyvinyl alcohol is produced, a cluster having a mass of 70% or more based on a total mass of the mixture is formed and when a load of 5.3 g/mm2 or more and 7.1 g/mm2 or less is applied to the cluster, a cluster having a mass of 90% or more based on a total mass of the cluster is formed.

2. The ink composition according to claim 1, comprising at least one or two or more kinds of glycerol, 1,2-hexanediol, propylene glycol, 2-pyrolidone, N-methyl-2-pyrolidone, ethanol, ethylene glycol, triethanolamine, pentanediol, and amide solvents as the first organic solvent.

3. The ink composition according to claim 1, comprising at least one or two or more kinds of diethylene glycol, triethylene glycol, dipropylene glycol, tripropyrene glycol, diethylene glycol monohexyl ether, diethylene glycol mono-2-ethyl hexyl ether, tetraethylene glycol monohexyl ether, tetraethylene glycol mono-2-ethyl hexyl ether, hexaethylene glycol mono-2-ethyl hexyl ether, 2-methoxy ethanol, diethylene glycol monobutyl ether, diethylene glycol monomethyl ether, triethylene glycol monomethyl ether, triethylene glycol monobutyl ether, dipropylene glycol monopropyl ether, ethylene glycol monoethyl ether, and ethylene glycol monobutyl ether as the second organic solvent.

4. The ink composition according to claim 3, comprising glycol ether having an alkyl group having 6 to 8 carbon atoms as the second organic solvent.

5. The ink composition according to claim 1, wherein a total content of the first organic solvent and the second organic solvent is 15% by mass or more and 50% by mass or less.

6. The ink composition according to claim 1, wherein the content of the first organic solvent is 15% by mass or more and 40% by mass or less.

7. The ink composition according to claim 1, wherein the content of the second organic solvent is 0.1% by mass or more and 5% by mass or less.

8. The ink composition according to claim 1, wherein solubility in 100 g of 20° C. water of both the first organic solvent and the second organic solvent is 10 g or more.

9. An ink jet recording method, which is an ink jet recording method of performing recording on a recording medium having an ink receiving layer containing polyvinyl alcohol, the method comprising:
    making the ink composition according to claim 1 adhere to the ink receiving layer.

* * * * *